United States Patent [19]

Nakamura

[11] 3,960,792
[45] June 1, 1976

[54] PLASTIC FOAM
[75] Inventor: Masao Nakamura, Midland, Mich.
[73] Assignee: The Dow Chemical Company, Midland, Mich.
[22] Filed: Sept. 2, 1971
[21] Appl. No.: 177,456

Related U.S. Application Data

[63] Continuation-in-part of Ser. No. 743,639, July 10, 1968, abandoned, which is a continuation-in-part of Ser. No. 519,190, Jan. 7, 1966, abandoned, which is a continuation-in-part of Ser. No. 251,765, Jan. 16, 1963, abandoned.

[52] U.S. Cl. ................ 260/2.5 E; 260/2.5 R; 260/2.5 B
[51] Int. Cl.² .......................... C08J 9/30
[58] Field of Search .................. 260/2.5 E

[56] References Cited
UNITED STATES PATENTS

| | | | |
|---|---|---|---|
| 2,387,730 | 10/1945 | Alderson, Jr. | 260/2.5 E |
| 2,409,910 | 7/1946 | Stober | 260/2.5 E |
| 2,515,250 | 7/1950 | McIntire | 260/2.5 E |
| 2,848,428 | 8/1958 | Rubens | 260/2.5 E |
| 2,884,386 | 4/1959 | McMillan et al. | 260/2.5 E |
| 2,928,130 | 3/1960 | Grey | 260/2.5 E |
| 3,121,130 | 2/1964 | Wiley et al. | 260/2.5 E |
| 3,121,911 | 2/1964 | Lightner | 260/2.5 E |

Primary Examiner—Morton Foelak
Attorney, Agent, or Firm—R. B. Ingraham

[57] ABSTRACT

Dimensionally stable polystyrene foams are prepared by using a mixture of blowing agents which has a diffusion rate through the polystyrene approximating that of air.

5 Claims, No Drawings

PLASTIC FOAM

This application is a continuation-in-part of my copending application Ser. No. 743,639, filed July 10, 1968 now abandoned, which in turn was a continuation-in-part of my previous application Ser. No. 519,190, filed Jan. 7, 1966, now abandoned, which in turn was a continuation-in-part of my prior application Ser. No. 251,765, filed Jan. 16, 1963, also now abandoned.

This invention relates to an improved method of preparing thermoplastic resinous cellular bodies, and more particularly relates to expanded cellular polystyrene bodies having superior dimensional stability.

Presently known techniques of preparing expanded polystyrene include the extrusion of a thermoplastic resinous gel in admixture with a volatile raising or blowing agent into a region of lower pressure where the volatile raising agent vaporizes and forms a plurality of gas cells within the extruded gel. The extruded foamed gel is subsequently cooled to form a self-supporting or cellular foamed body. A wide variety of foaming or raising agents are known. These primarily fall into the class of aliphatic hydrocarbons such as butane, hexane, heptane, pentanes and the like, as well as gases which are soluble in a polymer under pressure such as carbon dioxide. Beneficially, certain fluorinated hydrocarbons are used such as trichlorofluoromethane, trifluoromethane and the like, as well as such chlorohydrocarbons as methyl chloride. Many of these raising agents are found to be satisfactory with various polymeric materials. However, there appear to be certain defects giving rise to shrinkage, warpage and relatively poor dimensional stability of the product once formed. For example, when a material such as polystyrene is extruded with conventional raising agents and formed by a rectangular shaping orifice, frequently the material will swell and bulge into a log or plank which deviates considerably from a rectangular form. Oftentimes shrinkage may occur wherein the edges of the body will maintain a position roughly equivalent to the edges as extruded. However, the surfaces between the edges will be drawn inwardly. Warpage of this nature will also occur if suitable extrusion and cooling cycles are not maintained, but warpage which oftentimes occurs after the cooling of the extruded gel below its solidification temperature occurs over a period of many hours and at times, many days. If a log or plank of a polystyrene is extruded to a generally rectangular form and cooled under suitable conditions, a product having relatively regular geometric shape will be obtained. However, shrinkage or swelling will cause the form to be distorted and for most commercial applications, regular rectangular forms are required. In cutting such a distorted log into a rectangular form, considerable product is lost and must be discarded as scrap. It also requires that prior to forming planks, boards or other articles to a final size the foamed polystyrene must be maintained in storage for a sufficient length of time that substantially all shrinkage or warping has stopped.

It is an object of this invention to provide an improved method for the preparation of foamed or cellular polystyrene bodies.

It is a further object of this invention to provide a method for preparing dimensionally stable cellular polystyrene.

These benefits and other advantages in accordance with the invention are readily achieved by utilizing in the preparation of an expanded, closed cell polystyrene a raising agent which is a mixture of at least two carbon-containing compounds and has a gas diffusion rate through the polystyrene which is from about 0.75 to 6 times the diffusion rate of air through polystyrene.

Polystyrene is well known in the art as are processes and methods for admixing it with volatile raising agents and extruding into cellular shaped bodies as well as techniques for preparing particulate expandable polystyrene compositions. The particulate expandable polystyrene compositions most often are utilized for molding of foamed or cellular articles which is usually accomplished by prefoaming the particles to a portion of their ultimate volume, placing them within a closed mold, subsequently heating the particles to foam them and bond them together into a unitary embodiment.

A wide variety of volatile fluid foaming agents which are carbon-containing compounds; that is, they have carbon chemically combined in their molecules, can be utilized in the practice of the present invention. They include such materials as the aliphatic hydrocarbons including ethane, ethylene, propane, propylene, butane, butylene, isobutane, pentane, neopentane, isopentane, hexane, heptane and mixtures thereof, as well as chlorinated and fluorinated and chlorofluorinated hydrocarbons. When utilized with the polystyrene resins generally the boiling point of such materials should not be greater than about 95°C. at 760 millimeters of mercury absolute pressure. Other suitable fluid foaming agents are the perchlorofluorocarbons such as

| | |
|---|---|
| $CCl_3F$ | $CF_2-CClF$ |
| $CCl_2F_2$ | $CF_2-CH_2$ |
| $CClF_3$ | |
| $CCl_2F-CCl_2F$ | $CF_2-CClF$ |
| $CClF_2-CCl_2F$ | $CF_2-CClF$ |
| $CClF_2-CClF_2$ | | and tetraalkyl silanes such as tetramethylsilane, trimethylethylsilane, trimethylisopropylsilane and trimethyl n-propylsilane, having a boiling point not higher than 95°C. at 760 millimeters absolute pressure. The volatile fluid foaming agent is employed in amounts corresponding to from about 0.05 to 0.4 gram molecular proportion of the volatile fluid compound per 100 grams by weight of the normally solid styrene polymer starting material. Beneficially, such fluid or raising agents may be incorporated into the thermoplastic resinous material at any suitable time prior to the preparation of the foamed body according to methods well known to the art. It is essential to the practice of the present invention that the raising agents incorporated within the polymeric material have a vapor transmission rate of from about 0.75 to 6 times the transmission rate of the gas within which the foamed body is to reside; that is, a foamed plastic body which is to be cured and used in air must have a blowing agent added thereto which has a vapor transmission rate through the resin lying within the above delineated limits. Preferably, for maximum dimensional stability, the blowing agent mixture should have a vapor transmission rate from about 0.75 to about 3 times the rate of transmission through the polymeric material. Various and different characteristics are imparted to the foamed polystyrene body by the blowing agents. For specific applications, blowing agents imparting the desired characteristics are employed. For example, such factors as toxicity, fire hazard, thermal conductivity, the economic cost, as well as, in certain instances, the solubility of the blowing agent in the polymer. For example, if a foam has been prepared by an extrusion technique, generally it is desirable that the melt viscosity of the polymer at the extrusion temperature be reduced to a relatively low value in order to achieve maximum output for a particular piece of equipment and to require minimum energy or power input. Methyl chloride, for example, has a vapor transmission rate through polystyrene of about 1000 cubic centimeters at 25°C. an absolute pressure of one atmosphere per mil of polymer thickness per 24 hour period per 100 square inches of exposed surface with a pressure differential of one atmosphere across the polymer sheet being tested at a temperature of 25°C. Under identical conditions a material such as difluorodichloromethane has a transmission rate through polystyrene of about 0.17 cubic centimeter of gas under one atmosphere at 25°C. The transmission rate for air is 100 cubic centimeters of gas under one atmosphere at 25°C., oxygen about 300 cubic centimeters (one atmosphere at 25°C.) and nitrogen about 60 cubic centimeters (one atmosphere at 25°C.). Transmission rates for various materials are set forth in Table I below.

TABLE I

| MATERIAL EVALUATED | TRANSMISSION RATE | |
|---|---|---|
| Methyl chloride | | 1000 |
| Oxygen | | 300 |
| Nitrogen | | 50 |
| Carbon dioxide | | 1200 |
| Helium | | 2200 |
| Hydrogen | | 2900 |
| Normal pentane | | 3.5 |
| Dichlorodifluoromethane | | 0.17 |
| Octafluorocyclobutane | | 0.3 |
| Bromotrifluoromethane | less than | 0.3 |
| Chlorodifluoromethane | less than | 0.25 |
| 1,2-Dichlorotetrafluoroethane | less than | 0.25 |
| 1,1-Dichlorotetrafluoroethane | less than | 0.3 |
| Pentafluoroethane | less than | 0.25 |
| 2-Chloro-1,1,1-trifluoroethane | less than | 0.5 |
| 1,1,1,2-Tetrafluoroethane | less than | 1.1 |
| 2-Chloro-1,1-difluoroethane | less than | 0.2 |
| 1,1,1-Trifluoroethane | less than | 0.35 |
| 1,1,1-Trifluoropropane | less than | 0.5 |
| Trichlorotrifluoroethane | greater than | 3000 |
| Bromodifluoromethane | greater than | 3000 |
| Difluoromethane | greater than | 3000 |
| 2-Chloro-1,1,1,2-tetra-fluoroethane | greater than | 3000 |
| 2,2-Difluoropropane | greater than | 3000 |
| Ethyl chloride | greater than | 3000 |
| Air | | 100 |
| *Isobutane | | 1.3 |
| 40 Dichlorodifluoromethane 60 Methyl chloride | | 600 |
| 50 Dichlorodifluoromethane 50 Methyl chloride | | 500 |
| 60 Dichlorodifluoromethane 40 Methyl chloride | | 400 |
| 70 Dichlorodifluoromethane 30 Methyl chloride | | 300 |
| 80 Dichlorodifluoromethane 20 Methyl chloride | | 200 |
| 90 Dichlorodifluoromethane 10 Methyl chloride | | 102 |
| 95 Dichlorodifluoromethane 5 Methyl chloride | | 50.2 |

*Isobutane determined by sorption-desorption wherein film sample weighed in isobutane atmosphere. Increase in weight noted with time. Diffusion and solubility constants determined.

If, for example, a blowing agent such as methyl chloride is utilized in the preparation of a polystyrene foam, one of the most common problems is subsequent shrinkage and distortion after the foam has been prepared and after it has been cooled below its plastic temperature. It appears that the methyl chloride leaves the cells resulting in a reduced pressure therein and foams of low density tend to collapse; that is, they are crushed by the atmospheric pressure. By contrast, if low density foam is prepared using a blowing agent such as difluorodichloromethane, there is a marked tendency for the foam to swell as air diffuses into the polymer and the organic blowing agent is unable to escape at a rate approaching that of the air diffusing in. Subsequently, such products are characterized by bulging or swelling after an extended period, such as standing about 2 or 3 weeks at room temperature. Such shrinkage and swell or bulge problems are eliminated by utilizing a suitable mixture of the blowing or raising agents which provides a liquid blowing agent having a vapor transmission rate approximating that of air or the gas within which the foam is disposed.

By way of further illustration, polystyrene was extruded utilizing 12 percent by weight based on the weight of the polymer of a blowing agent which comprised 50 parts of difluorodichloromethane and 50 parts of methyl chloride. 0.277 Parts per hundred of barium stearate were utilized as extrusion lubricant. The polymer was thoroughly admixed with the additives and extruded to form a foamed plank 4 inches in thickness and 16 inches in width. The extrusion rate of the polystyrene composition was 812 pounds per hour, which included 12 percent of the blowing agent mixture based on the weight of the extrude. The die pressure was 310 pounds per square inch. The gel temperature within the extruder was 225°C. Immediately prior to extrusion within the die the temperature of the extruded polystyrene gel was lowered to 104°C. The gel was extruded from an orifice having a width of 8¼ inches and a height of 0.112 inch. Immediately adjacent the orifice were a pair of forming plates spaced on either side of the extruder opening. The plates had a length of 30 inches and were covered for a distance of 16 inches from the die with a thin coating of polytetrafluoroethylene. Adjacent the ends of the orifice and disposed between the forming plates were two deflecting plates each about 1¼ inches in length and diverging outwardly from the die opening at angles of about 45°. The extrude was a continuous board or plank having a density of 1.89 pounds per cubic foot and a cell size (i.e., the average diameter of the cells) ranging between 0.6 and 0.7 millimeter. A portion of the extruded foam was cured for a period of 8 days at a temperature of 140°F. and allowed to cure for a period of 3 months at a temperature of about 15°–25°C. At the end of this period the dimensional stability of the foam was tested by taking portions of the planks and placing them in an air oven at temperatures of 160°F., 170°F. and 175°F. for extended periods. At 160°F. after 48 hours, the plank was observed to have shrunk in width by about 0.05 percent. The shrinkage in length was substantially below 0.05 percent. At 170°F. about 1/10 of one percent expansion was observed at 4, 8 and 24 hours. However, at 48 hours, the plank had regained its original dimension. At 175°F. and 24 hours, a 2/10 of one percent expansion in length and a 4/10 of one percent expansion in width were observed. At 48 hours at 175°F., the expansion in length was 2/10 of one percent and the expansion in width was 6/10 of one percent.

In a manner similar to the foregoing illustration, polystyrene foam was prepared utilizing a feed rate in a substantially identical manner with the exception that the blowing agent comprised 40 parts of difluorodichloromethane, 10 parts of trichlorofluoromethane, "Freon 11", and 50 parts of methyl chloride. The polymer was extruded at a rate of 808 pounds per hour and there was added 13 pounds of the blowing agent mixture per hundred pounds of polymer. The die pressure was 520 pounds per square inch. The extruder gel temperature was 226½°C. at the die. The blowing agent-containing gel was cooled to 103.9°C. The orifice was 6⅝ inches long and 0.060 inch in width. The resultant foam had a density of 1.79 pounds per cubic foot and a cell size of about one millimeter. After aging and curing in the manner of the previous example, planks were evaluated for dimensional stability with the following results: longitudinal shrinkage after 48 hours at about 160°F. was about 1/10 of one percent; at 170°F. at 48 hours, in the longitudinal direction the plank expanded 1/10 of one percent; at 175°F. at 48 hours the plank expanded 0.8 percent in the longitudinal direction; at 160°F. and 175°F. there was 0.4 percent shrinkage and at 170°F. about 0.6 percent shrinkage. By way of comparison, extrusions were carried out wherein substantially similar conditions were maintained with the exception that the blowing agent comprised 100 percent methyl chloride. Stability evaluation at 175°F. at 48 hours indicated a longitudinal shrinkage of about 5.5 percent; at 170°F. in 48 hours the shrinkage in the longitudinal direction was about 9.5 percent. Similar beneficial and advantageous results are obtained when polystyrene is extruded utilizing as blowing agents mixtures of 60 parts of methyl chloride and 40 parts of dichlorodifluoromethane; 30 parts of methyl chloride, 30 parts of neopentane and 40 parts of dichlorodifluoromethane; 50 parts of methyl chloride, 25 parts of difluorodichloromethane and 25 parts of dichlorotetrafluoroethane; 50 parts of methyl chloride and 50 parts of dichlorotetrafluoroethane; 40 parts of methyl chloride and 50 parts of dichlorotetrafluoroethane and 10 parts of trichlorofluoromethane; 40 parts of methyl chloride, 50 parts of dichlorotetrafluoroethane and 10 parts of trichlorotrifluoroethane. Similar beneficial results are achieved when such blowing agent mixtures are utilized with polymers of styrene such as styrene acrylonitrile polymers containing 70 percent styrene and 30 percent acrylonitrile; 80 percent styrene and 20 percent vinyl toluene; polymers of tertiary-butyl styrene; copolymers of styrene and methyl methacrylate such as those containing 75 percent styrene and 25 percent methyl methacrylate.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. In a process for the preparation of an expanded closed cell polystyrene resin which includes incorporated within said polystyrene resin a volatile fluid foaming agent which is a non-solvent for the polystyrene resin, subsequently expanding the polystyrene resin containing the fluid foaming agent by subjecting the expandable resin containing the fluid foaming agent to a pressure sufficiently low to permit the polystyrene resin to expand when the polystyrene resin containing the fluid foaming agent is in a heat plastified condition, and subsequently cooling the expanded polystyrene resin to form a closed cell polystyrene resin body, the improvement which comprises preparing a dimensionally stable expanded closed cell body by employing as the fluid foaming agent a volatile material which has a diffusion rate through the polystyrene resin which is about 0.75 to 6 times the diffusion rate of air through polystyrene resin, and the foaming agent consisting essentially of a mixture of at least two compounds having carbon chemically combined therein.

2. The method of claim 1 wherein the expanded polystyrene resin body is cured at an elevated temperature in an atmosphere of air.

3. The method of claim 2 wherein said expanded polystyrene resin body is cured in an atmosphere of air at a temperature between about 160°F. and 180°F. until at least a major portion of the fluid foaming agent has diffused from the foam and is replaced by air.

4. In a process for the preparation of an expanded closed cell polystyrene which is a solid polymer which includes incorporating within the polystyrene a volatile fluid foaming agent, subsequently expanding the polystyrene containing the fluid foaming agent which is a non-solvent for the polystyrene by subjecting heat plastified expandable polystyrene containing the fluid foaming agent to a pressure sufficiently low to permit the polystyrene to expand and subsequently cooling the resultant expanded mass to form a closed cell polystyrene body, the improvement which comprises employing as a volatile fluid foaming agent a volatile material, the foaming agent consisting essentially of a mixture of compounds each containing chemically combined carbon, and the mixture having a transmission rate through polystyrene which is about 0.75 to 3 times the transmission rate of air through polystyrene.

5. In a process for the preparation of an expanded closed cell polystyrene resin which includes incorporated within said polystyrene resin a volatile fluid foaming agent which is a non-solvent for the polystyrene resin, subsequently expanding the polystyrene resin containing the fluid foaming agent by subjecting the expandable resin containing the fluid foaming agent to a pressure sufficiently low to permit the polystyrene resin to expand when the polystyrene resin containing the fluid foaming agent is in a heat plastified condition, and subsequently cooling the expanded polystyrene resin to form a closed cell polystyrene resin body, the improvement which comprises preparing a dimensionally stable expanded closed cell body by employing as the fluid foaming agent a volatile material which has a diffusion rate through the polystyrene resin which is about 0.75 to 6 times the diffusion rate of air through polystyrene resin, and the foaming agent consisting essentially of a mixture which comprises from 40 to 60 percent by weight of methyl chloride and from 60 to 40 percent by weight of dichlorodifluoromethane.

* * * * *